(12) United States Patent
Song

(10) Patent No.: US 8,904,034 B2
(45) Date of Patent: Dec. 2, 2014

(54) METHOD AND APPARATUS FOR PROCESSING NETWORK CONGESTION AND CORE NETWORK ENTITY

(75) Inventor: Xiaoli Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 239 days.

(21) Appl. No.: 13/701,398

(22) PCT Filed: Mar. 22, 2011

(86) PCT No.: PCT/CN2011/072056
§ 371 (c)(1),
(2), (4) Date: Jan. 5, 2013

(87) PCT Pub. No.: WO2011/153860
PCT Pub. Date: Dec. 15, 2011

(65) Prior Publication Data
US 2013/0111061 A1    May 2, 2013

(30) Foreign Application Priority Data
Jun. 9, 2010 (CN) .......................... 2010 1 0196092

(51) Int. Cl.
*G06F 15/16* (2006.01)
*H04L 29/06* (2006.01)
*H04L 12/801* (2013.01)
*H04L 12/825* (2013.01)

(52) U.S. Cl.
CPC ................ *H04L 69/02* (2013.01); *H04L 47/12* (2013.01); *H04L 47/26* (2013.01)
USPC .......................................... 709/235; 370/230

(58) Field of Classification Search
CPC .......... H04L 47/12; H04L 69/02; H04L 47/26
USPC .......... 709/200–202, 232, 233, 235; 370/230, 370/235, 413
See application file for complete search history.

(56) References Cited

U.S. PATENT DOCUMENTS

| | | | |
|---|---|---|---|
| 7,200,116 B2 * | 4/2007 | Kobayashi | 370/237 |
| 7,613,184 B2 * | 11/2009 | Chiruvolu et al. | 370/392 |

(Continued)

FOREIGN PATENT DOCUMENTS

| | | |
|---|---|---|
| CN | 101227495 A | 7/2008 |
| CN | 101296187 A | 10/2008 |
| CN | 101582852 A | 11/2009 |

OTHER PUBLICATIONS

International Search Report in international application No. PCT/CN2011/072056, mailed on Jul. 7, 2011.

(Continued)

*Primary Examiner* — Moustafa M Meky
(74) *Attorney, Agent, or Firm* — Oppedahl Patent Law Firm LLC

(57) ABSTRACT

The disclosure discloses a method, an apparatus and a core network entity for processing network congestion, which enable: extracting adjacent data packets which have the same number as that of the preset interval value from an output port queue when the output port is detected to be in congestion state, and acquiring the source terminal address information of the adjacent data packets; searching for the source terminal transmitting the most data packets according to the source terminal address information; and transmitting a congestion information to the source terminal transmitting the most data packets. By extracting adjacent data packets which have the same number as that of the preset interval value from an output port queue when the output port is detected to be in congestion state, and acquiring the source terminal address information of the adjacent data packets; searching for the source terminal transmitting the most data packets according to the source terminal address information; and transmitting the congestion information to the source terminal, the disclosure makes the source terminal decrease the data transmission rate, so as to eliminate the network congestion. Therefore, the success rate of eliminating the network congestion is increased.

14 Claims, 5 Drawing Sheets

(56) References Cited

U.S. PATENT DOCUMENTS

| | | |
|---|---|---|
| 7,817,558 B2 | 10/2010 | Li |
| 8,345,548 B2* | 1/2013 | Gusat et al. ............ 370/230 |
| 2002/0118641 A1* | 8/2002 | Kobayashi ............ 370/230 |
| 2005/0129008 A1* | 6/2005 | Doshi et al. ............ 370/389 |
| 2007/0053356 A1* | 3/2007 | Konda ............ 370/390 |
| 2007/0268830 A1 | 11/2007 | Li |
| 2008/0273465 A1* | 11/2008 | Gusat et al. ............ 370/236 |
| 2010/0177637 A1* | 7/2010 | Kadambi et al. ............ 370/235 |

OTHER PUBLICATIONS

English Translation of the Written Opinion of the International Search Authority in international application No. PCT/CN2011/072056, mailed on Jul. 7, 2011.

* cited by examiner

METHOD AND APPARATUS FOR PROCESSING NETWORK CONGESTION AND CORE NETWORK ENTITY

TECHNICAL FIELD

The disclosure relates to the technical field of communications, in particular to a method, an apparatus and a core network entity for processing network congestion.

BACKGROUND

With the rapid development of Internet technologies, the quantity of services interacted in the network is increasing, while users also set a higher requirement on network performance. Meanwhile, during the interacting process of service data, such problems of network as congestion, delay and packet loss become more and more serious.

Generally, in the prior art, the network congestion state is eliminated by the following way: a core network entity configured with a congestion detection capability detects its own output port and samples an output port queue, and creates a congestion message and transmits the congestion message to a terminal corresponding to the sampled point causing the congestion if detecting that the output port is in congestion state; and the terminal decreases its own data transmission rate according to the received congestion message. See FIG. 1, terminals 1, 2, 3 and 4 transmit data to terminal 5 through core network entities B1, B2 and B3, wherein B3 has a congestion detection and congestion information transmitting capability, and B3 samples the output port queue periodically; and B3 transmits a congestion message to a source terminal corresponding to the data packet of the sampled point when detecting that the output port is in congestion state.

A wrong judgment always occurs by the way of eliminating network congestion state mentioned above, see FIG. 2, multiple data packets containing source address information for transmitting the data packets are buffered in the output port queue of B3 in turn; it can be seen from FIG. 2 that the congestion of B3 is caused by terminal 1, however, the source terminal corresponding to the data packet sampled from the output port queue is terminal 2 when B3 detects that the output port is in congestion state, so, B3 determines that the congestion of the output port is caused by terminal 2 and transmits a congestion message to terminal 2 so as to make terminal 2 decrease the data transmission rate. Whereas, terminal 1 which actually causes the congestion of B3 still keeps a rapid data transmission. In this case, the congestion state of B3 is not eliminated and may even worsen the congestion state.

SUMMARY

The main objective of the disclosure is to provide a method, an apparatus and a core network entity for processing network congestion, in order to increase the success rate of eliminating the network congestion.

To fulfil the objective above, the technical scheme of the disclosure is realized as follows.

A method for processing network congestion, includes:
extracting adjacent data packets which have the same number as that of the preset interval value from an output port queue when the output port is detected to be in congestion state, and acquiring the source terminal address information of the adjacent data packets;

searching for the source terminal transmitting the most data packets according to the acquired source terminal address information; and transmitting a congestion information to the source terminal transmitting the most data packets.

The process of transmitting the congestion information to the source terminal transmitting the most data packets includes:
judging whether the source terminals transmitting the most data packets is one or more;

determining the size of the congestion degree when there are multiple source terminals transmitting the most data packets, transmitting the congestion information to all or one of the source terminals transmitting the most data packets according to the determined result; and transmitting the congestion information to the source terminal transmitting the most data packets when there is one source terminal transmitting the most data packets.

The method for determining the size of the congestion degree includes:
comparing the value of the congestion degree with the preset threshold value; and it indicates that the congestion degree is large when the value of the congestion degree is more than or equal to the preset threshold value, otherwise, it indicates that the congestion degree is small.

The process of transmitting the congestion information to all or one of the source terminals transmitting the most data packets according to the determined result includes:
transmitting the congestion information to one of the source terminals transmitting the most data packets when the congestion degree is small; and transmitting the congestion information to all of the source terminals transmitting the most data packets when the congestion degree is large.

An apparatus for processing the network congestion, includes:
an acquiring module, which is configured to extract adjacent data packets which have the same number as that of the preset interval value from an output port queue when the output port is detected to be in congestion state, and acquire the source terminal address information of the adjacent data packets;

a searching module, which is configured to search the source terminal transmitting the most data packets according to the source terminal address information; and a transmitting module, which is configured to transmit a congestion information to the source terminal transmitting the most data packets.

When searching for the source terminal transmitting the most data packets, the searching module is specifically configured to judge whether the source terminals transmitting the most data packets is one or more, and determine the size of the congestion degree when there are multiple source terminals transmitting the most data packets;

when transmitting the congestion information, the transmitting module is specifically configured to transmit the congestion information to all or one of the source terminals transmitting the most data packets according to the determined result when there are multiple source terminals transmitting the most data packets, and transmit the congestion information to the source terminal transmitting the most data packets when there is one source terminal transmitting the most data packets.

When determining the size of the congestion degree, the searching module is specifically configured to compare the value of the congestion degree with the preset threshold value, it indicates that the congestion degree is large when the value of the congestion degree is more than or equal to the preset threshold value, otherwise, it indicates that the congestion degree is small.

When transmitting the congestion information, the transmitting module is specifically configured to transmit the congestion information to one of the source terminals transmitting the most data packets when the congestion degree is small, and transmit the congestion information to all the source terminals transmitting the most data packets when the congestion degree is large.

A core network entity, includes the apparatus for processing the network congestion, wherein the apparatus for processing the network congestion includes:

an acquiring module, which is configured to extract adjacent data packets which have the same number as that of the preset interval value from an output port queue when the output port is detected to be in congestion state, and acquire the source terminal address information of the adjacent data packets;

a searching module, which is configured to search the source terminal transmitting the most data packets according to the source terminal address information; and a transmitting module, which is configured to transmit a congestion information to the source terminal transmitting the most data packets.

The apparatus for processing the network congestion is the apparatus for processing the network congestion in any one of claims 6 to 8.

According to the method, apparatus and core network entity for processing the network congestion provided by the disclosure, extracts adjacent data packets which have the same number as that of the preset interval value from an output port queue, acquires the source terminal address information of the adjacent data packets, searches the source terminal transmitting the most data packets according to the source terminal address information, and transmits a congestion information to the source terminal so as to make the source terminal decrease the data transmission rate, and to eliminate the network congestion. Therefore, the success rate of eliminating the network congestion is increased.

DETAILED DESCRIPTION

It should be understood that the specific embodiments described herein are only intended to explain the disclosure instead of limiting the disclosure.

Figure 1:
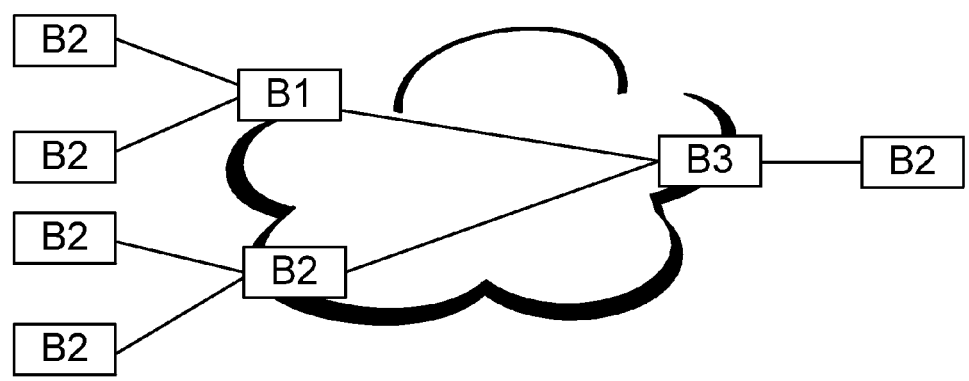
FIG. 1 is a diagram showing the structure of a system for processing network congestion in the prior art.
Figure 2:
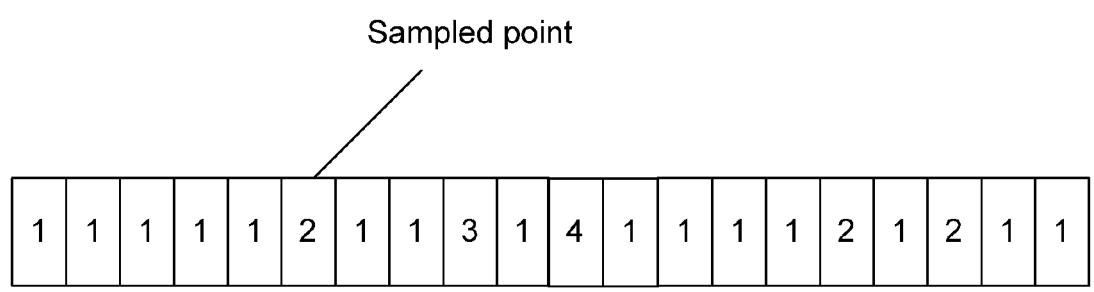
FIG. 2 is a diagram showing the sampling to a source terminal corresponding to a data packet in an output port queue in the prior art.
Figure 3:
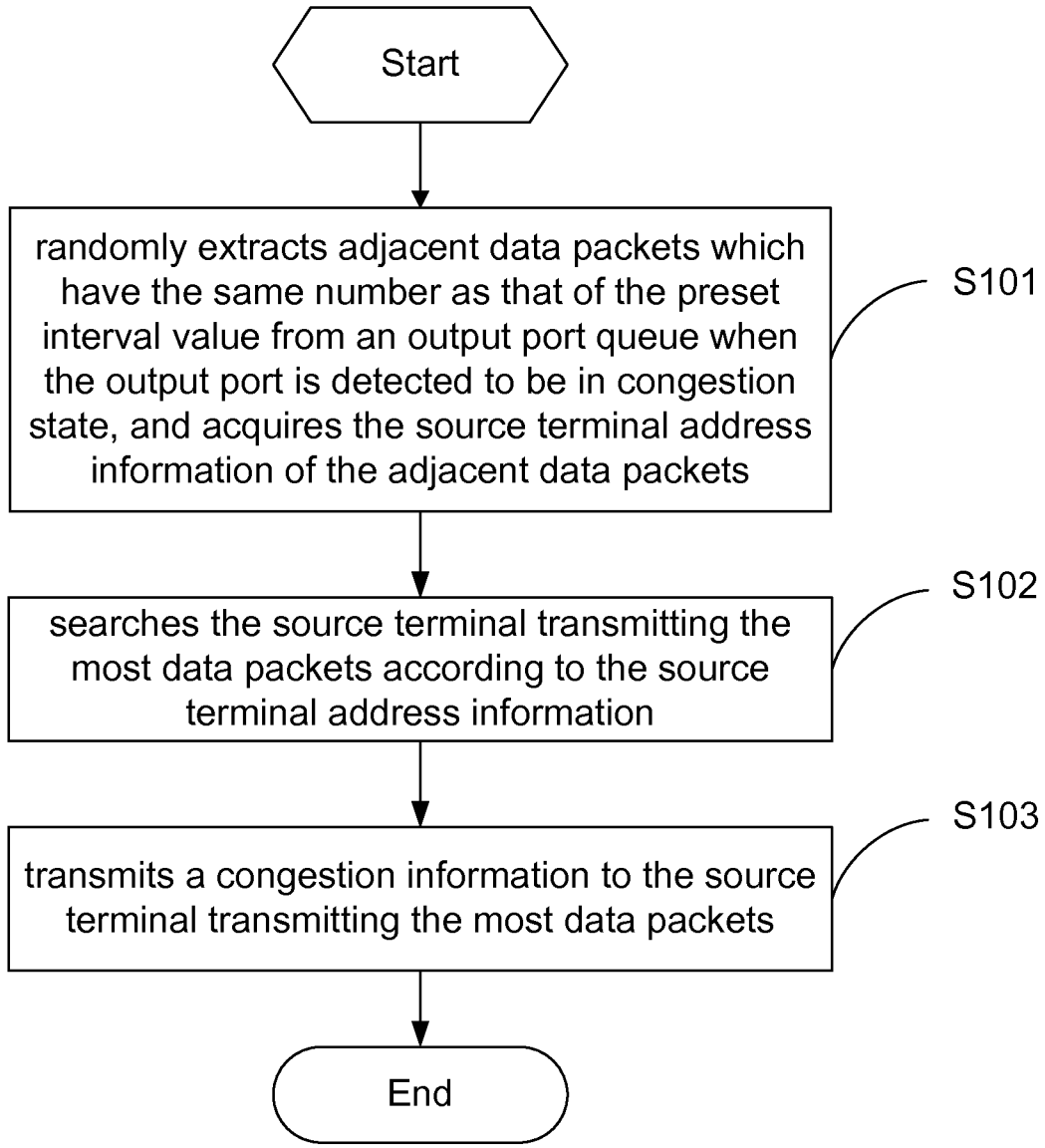
FIG. 3 is a flowchart of a method for processing network congestion in an embodiment of the disclosure.

See FIG. 3, an embodiment of a method for processing network congestion of the disclosure is provided, including:

Step S101: randomly extracts adjacent data packets which have the same number as that of the preset interval value from an output port queue if detecting that the output port is in congestion state, and acquires the source terminal address information of the adjacent data packets, wherein of course, the random extraction here is only one of the ways for extracting the data packet; and actually, the way for extracting the data packet is not limited to the random extraction and may be diverse, such as sequential extracting, extracting at a certain time interval and the like;

Step S102: searches for the source terminal transmitting the most data packets according to the source terminal address information; and Step S103: transmitting a congestion information to the source terminal that transmitting the most data packets.

The source terminal transmitting the most data packets is regarded as the terminal causing the congestion of the output port.

When the output port processes the congestion state, the data packets to be transmitted in the output port are arranged in turn according to the sequence of arriving at the output port, and are buffered to the output port queue, and each data packet includes the source terminal address information for transmitting the data packet.

In the embodiment, a congestion information to be transmitted to the source terminal transmitting the most data packets is further created according to the detected congestion degree when the output port is detected to be in congestion state. The congestion information includes a congestion degree value and a step value of the data transmission rate to be decreased. The source terminal receives the congestion information and decreases the data transmission rate by corresponding step value, so as to eliminate the congestion of the output port.

The size of the preset interval value can be set according to a network throughput and the number of network equipment.

Figure 4:
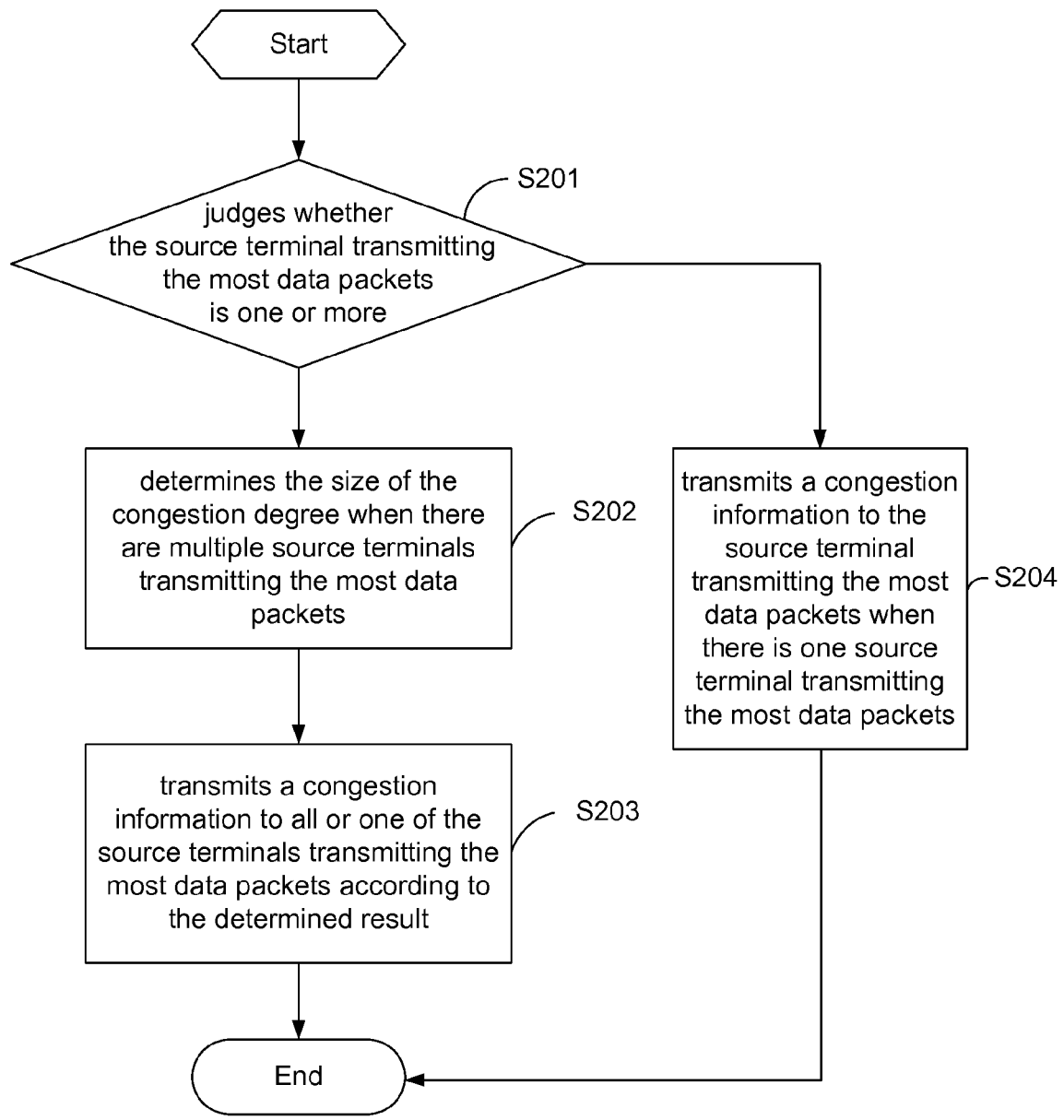
FIG. 4 is a flowchart of transmitting congestion information in a method embodiment for processing network congestion of the disclosure.

Furthermore, see FIG. 4, Step S103 in the embodiment specifically includes:

Step S201: judges whether the source terminal transmitting the most data packets is one or more;

Step S202: determines the size of the congestion degree when there are multiple source terminals transmitting the most data packets;

Step S203: transmits a congestion information to all or one of the source terminals transmitting the most data packets according to the determined result; and Step S204: transmits a congestion information to the source terminal transmitting the most data packets when there is one source terminal transmitting the most data packets.

Furthermore, determines the size of the congestion degree in the method for processing the network congestion of the disclosure specifically includes: comparing the value of the congestion degree with the preset threshold value, it indicates that the congestion degree is large when the value of the congestion degree is more than or equal to the preset threshold value; and it indicates that the congestion degree is small when the value of the congestion degree is smaller than the preset threshold value.

The preset threshold value needs to be set according to the actual running condition of the network.

Furthermore, the Step S204 specifically includes: transmitting a congestion information to one of the source terminals transmitting the most data packets when the congestion degree is small; transmitting a congestion information to the source terminal transmitting the most data packets when the congestion degree is large.

The congestion information is transmitted to one of the source terminals transmitting the most data packets when the congestion degree is small so as to ensure the full utilization of network broadband on the basis of eliminating the congestion.

Wherein, one of the source terminals transmitting the most data packets is selected as a target terminal transmitting the congestion information, wherein a specific selecting manner is selecting according to the priorities or the Media Access Control (MAC) address of the data packets transmitted by the source terminals. For example, transmits the congestion information to a source terminal corresponding to the data packets with a low priority to ensure the transmission rate of the data packets with a high priority; or, compares the degrees of importance of the source terminals corresponding to the MAC address and transmits the congestion information to a source terminal with a low degree of importance to ensure the transmission rate of the data packets in the source terminals with a high degree of importance.

In the embodiment, randomly extracts adjacent data packets which have the same number as that of the preset interval value from the output port queue, acquires the source terminal address information of the adjacent data packets, searches the source terminal transmitting the most data packets according to the source terminal address information, and transmits a congestion information to the source terminal so as to make the source terminal decrease the data transmission rate, and to eliminate the network congestion. Therefore, the success rate of eliminating the network congestion is increased.

Figure 5:
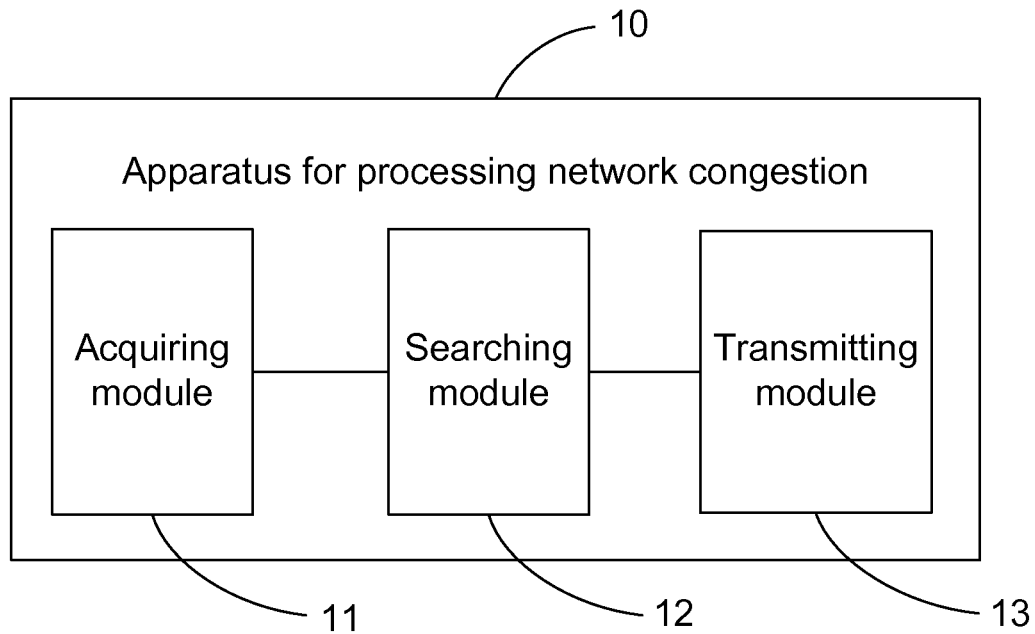
FIG. 5 is a diagram showing the structure of an apparatus for processing network congestion in an embodiment of the disclosure.

See FIG. 5, an embodiment of an apparatus 10 for processing network congestion is provided, including: an acquiring module 11, a searching module 12 and a transmitting module 13, wherein the acquiring module 11 is configured to randomly extract adjacent data packets which have the same number as that of the preset interval value from an output port queue when the output port is detected to be in congestion state, and acquire the source terminal address information of the adjacent data packets; the searching module 12 is configured to search the source terminal transmitting the most data packets according to the source terminal address information; and the transmitting module 13 is configured to transmit a congestion information to the source terminal transmitting the most data packets.

The source terminal transmitting the most data packets is regarded as the terminal causing the congestion of the output port.

When the output port processes the congestion state, the data packets to be transmitted in the output port are arranged in turn according to the sequence of arriving at the output port, and are buffered to the output port queue, and each data packet includes the source terminal address information for transmitting the data packet.

Figure 6:
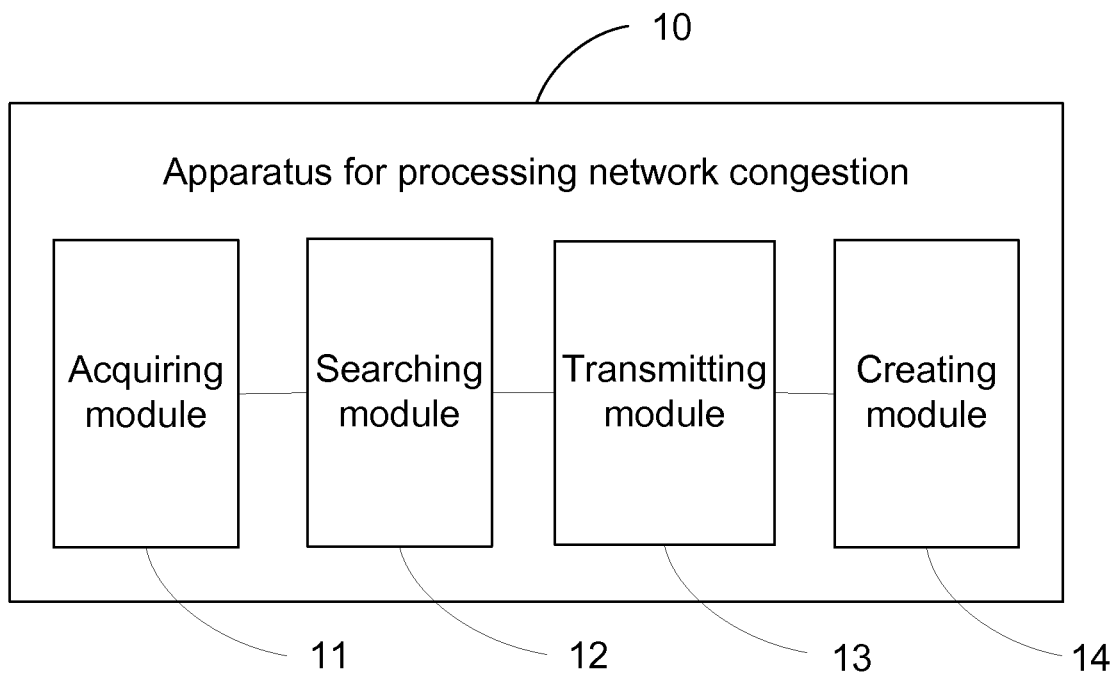
FIG. 6 is a diagram showing another structure of an apparatus for processing network congestion in an embodiment of the disclosure.

See FIG. 6, the apparatus 10 for processing the network congestion further includes a creating module 14, wherein the creating module 14 is configured to create the congestion information to be transmitted to the source terminal transmitting the most data packets according to the detected congestion degree when the output port is detected to be in congestion state. The congestion information includes a congestion degree value and a step value of the data transmission rate to be decreased. The source terminal decreases the data transmission rate by corresponding step value after receiving the congestion information, so as to eliminate the congestion of the output port.

The size of the preset interval value can be set according to a network throughput and the number of network equipment.

Furthermore, the searching module 12 is further configured to judge whether the source terminal transmitting the most data packets is one or more, and determine the size of the congestion degree when there are multiple source terminals transmitting the most data packets. The transmitting module 13 is configured to transmit the congestion information to all or one of the source terminals transmitting the most data packets according to the determined result after the size of the congestion degree is determined when there are multiple source terminals transmitting the most data packets, and transmit the congestion information to the source terminal transmitting the most data packets when there is one source terminal transmitting the most data packets.

Furthermore, the searching module 12 is further configured to compare the value of the congestion degree with the preset threshold value, wherein, it indicates that the congestion degree is large when the value of the congestion degree is more than or equal to the preset threshold value; and it indicates that the congestion degree is small when the value of the congestion degree is smaller than the preset threshold value.

The preset threshold value needs to be set according to the actual running condition of the network.

Furthermore, the transmitting module 13 is further configured to transmit the congestion information to one of the source terminals transmitting the most data packets when the congestion degree is small, and transmit the congestion information to the source terminals transmitting the most data packets when the congestion degree is large.

The transmitting module 13 transmits the congestion information to one of the source terminals transmitting the most data packets when the congestion degree is small so as to ensure the full utilization of network broadband on the basis of eliminating the congestion.

The searching module 12 selects one of the source terminals transmitting the most data packets as a target terminal transmitting the congestion information, wherein a specific selecting manner is selecting according to the priorities or the MAC address of the data packets transmitted by the source terminals. For example, transmits the congestion information to a source terminal corresponding to the data packets with a low priority to ensure the transmission rate of the data packets with a high priority; or, compares the degrees of importance of the source terminals corresponding to the MAC address and transmits the congestion information to a source terminal with a low degree of importance to ensure the transmission rate of the data packets in the source terminals with a high degree of importance.

In the embodiment, randomly extracts adjacent data packets which have the same number as that of the preset interval value from the output port queue, acquires the source terminal address information of the adjacent data packets, searches the source terminal transmitting the most data packets according to the source terminal address information, and transmits a congestion information to the source terminal so as to make the source terminal decrease the data transmission rate, and to eliminate the network congestion. Therefore, the success rate of eliminating the network congestion is increased.

Figure 7:
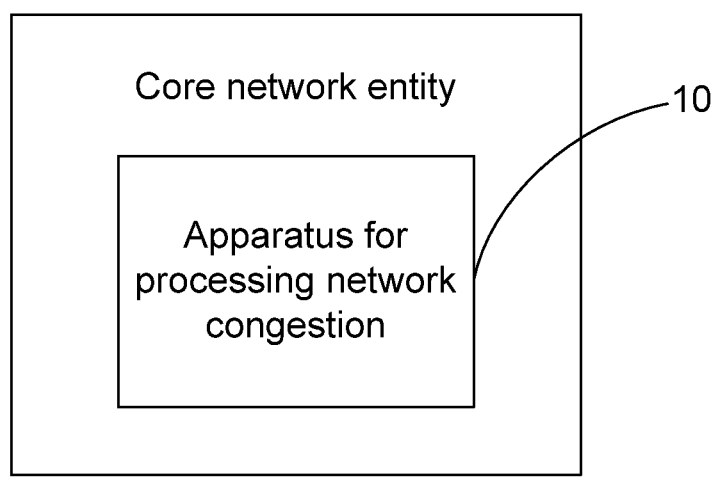
FIG. 7 is a diagram showing the structure of a core network entity in an embodiment of the disclosure.

See FIG. 7, a core network entity of the disclosure is provided, including the apparatus for processing the network congestion, wherein the apparatus for processing the network congestion is the apparatus 10 for processing the network congestion mentioned above, thereby needing no further description. The core network entity is a core switch.

It should be understood that what described above are only preferred embodiments of the disclosure, and are not intended to limit the scope of patent of the disclosure; and all the equivalent structure or equivalent flow change made by the description and drawings of the disclosure is directly or indirectly applied to other related technical fields and also within the protection scope of patent of the disclosure.

The invention claimed is:

1. A method for processing network congestion, comprising:
    extracting adjacent data packets which have the same number as that of the preset interval value from an output port queue when the output port is detected to be in congestion state, and acquiring the source terminal address information of the adjacent data packets;
    searching for the source terminal transmitting the most data packets according to the acquired source terminal address information; and
    transmitting a congestion information to the source terminal transmitting the most data packets.

2. The method according to claim 1, wherein the process of transmitting the congestion information to the source terminal transmitting the most data packets comprises:
    judging whether the source terminal transmitting the most data packets is one or more;
    determining the size of the congestion degree when there are multiple source terminals transmitting the most data packets,
    transmitting the congestion information to all or one of the source terminals transmitting the most data packets according to the determined result; and
    transmitting the congestion information to the source terminal transmitting the most data packets when there is one source terminal transmitting the most data packets.

3. The method according to claim 2, wherein the method for determining the size of the congestion degree comprises:
    comparing the value of the congestion degree with the preset threshold value; and
    it indicates that the congestion degree is large when the value of the congestion degree is more than or equal to the preset threshold value, otherwise, it indicates that the congestion degree is small.

4. The method according to claim 3, wherein the process of transmitting the congestion information to all or one of the source terminals transmitting the most data packets according to the determined result comprises:
    transmitting the congestion information to one of the source terminals transmitting the most data packets when the congestion degree is small; and
    transmitting the congestion information to all of the source terminals transmitting the most data packets when the congestion degree is large.

5. The method according to claim 2, wherein the process of transmitting the congestion information to all or one of the source terminals transmitting the most data packets according to the determined result comprises:
    transmitting the congestion information to one of the source terminals transmitting the most data packets when the congestion degree is small; and
    transmitting the congestion information to all of the source terminals transmitting the most data packets when the congestion degree is large.

6. An apparatus for processing the network congestion, comprising:
    an acquiring module, which is configured to extract adjacent data packets which have the same number as that of the preset interval value from an output port queue when the output port is detected to be in congestion state, and acquire the source terminal address information of the adjacent data packets;
    a searching module, which is configured to search the source terminal transmitting the most data packets according to the source terminal address information; and
    a transmitting module, which is configured to transmit a congestion information to the source terminal transmitting the most data packets.

7. The apparatus according to claim 6, wherein
    when searching for the source terminal transmitting the most data packets, the searching module is specifically configured to judge whether the source terminals transmitting the most data packets is one or more, and determine the size of the congestion degree when there are multiple source terminals transmitting the most data packets;
    when transmitting the congestion information, the transmitting module is specifically configured to transmit the congestion information to all or one of the source terminals transmitting the most data packets according to the determined result when there are multiple source terminals transmitting the most data packets, and transmit the congestion information to the source terminal transmitting the most data packets when there is one source terminal transmitting the most data packets.

8. The apparatus according to claim 7, wherein
    when determining the size of the congestion degree, the searching module is specifically configured to compare the value of the congestion degree with the preset threshold value, it indicates that the congestion degree is large when the value of the congestion degree is more than or equal to the preset threshold value, otherwise, it indicates that the congestion degree is small.

9. The apparatus according to claim 8, wherein
    when transmitting the congestion information, the transmitting module is specifically configured to transmit the congestion information to one of the source terminals transmitting the most data packets when the congestion degree is small, and transmit the congestion information to all the source terminals transmitting the most data packets when the congestion degree is large.

10. The apparatus according to claim 7, wherein
    when transmitting the congestion information, the transmitting module is specifically configured to transmit the congestion information to one of the source terminals transmitting the most data packets when the congestion degree is small, and transmit the congestion information to all the source terminals transmitting the most data packets when the congestion degree is large.

11. A core network entity, comprising the apparatus for processing the network congestion, wherein the apparatus for processing the network congestion comprises:
    an acquiring module, which is configured to extract adjacent data packets which have the same number as that of the preset interval value from an output port queue when the output port is detected to be in congestion state, and acquire the source terminal address information of the adjacent data packets;
    a searching module, which is configured to search the source terminal transmitting the most data packets according to the source terminal address information; and
    a transmitting module, which is configured to transmit a congestion information to the source terminal transmitting the most data packets.

12. The core network entity according to claim 11, wherein the apparatus for processing the network congestion is the apparatus for processing the network congestion in claim 7.

13. The core network entity according to claim 11, wherein the apparatus for processing the network congestion is the apparatus for processing the network congestion in claim 8.

14. The core network entity according to claim 11, wherein the apparatus for processing the network congestion is the apparatus for processing the network congestion in claim 10.

* * * * *